Oct. 16, 1928.
H. P. ARNT ET AL
1,687,487
TUBULAR SPOKE AND METHOD OF MAKING IT
Filed April 15, 1924      4 Sheets-Sheet 1
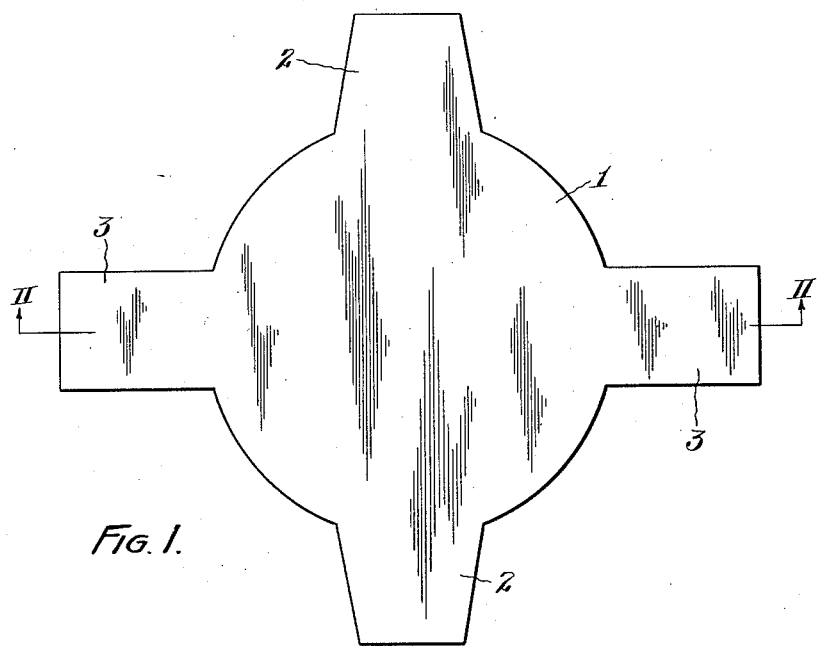
Fig. I.
Fig. II.
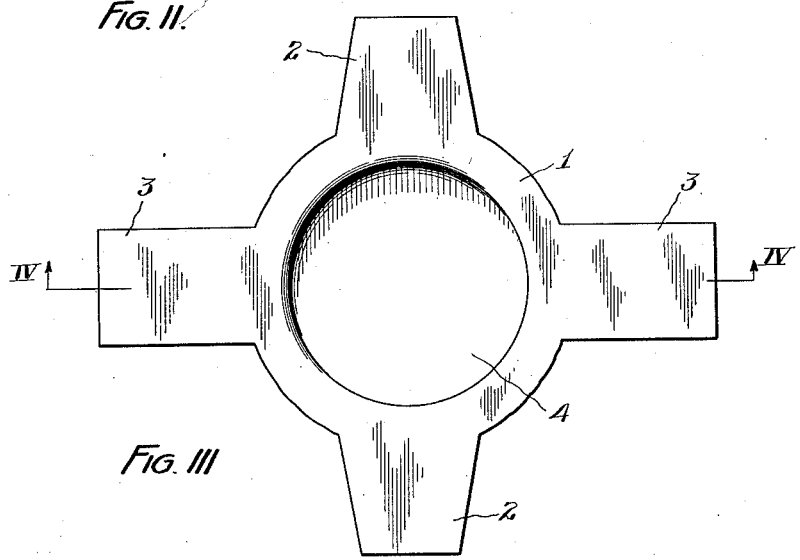
Fig. III
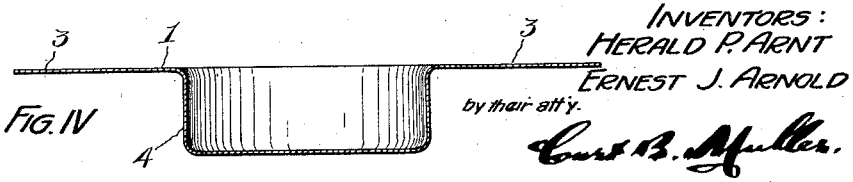
Fig. IV
INVENTORS:
HERALD P. ARNT
ERNEST J. ARNOLD
by their atty.
Curt B. Muller.

Oct. 16, 1928.
H. P. ARNT ET AL
1,687,487
TUBULAR SPOKE AND METHOD OF MAKING IT
Filed April 15, 1924    4 Sheets-Sheet 2
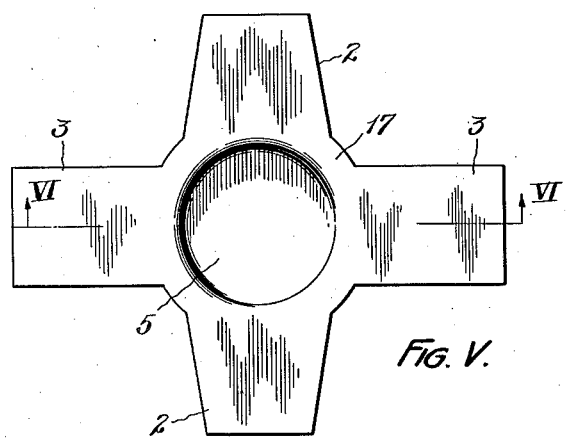
FIG. V.
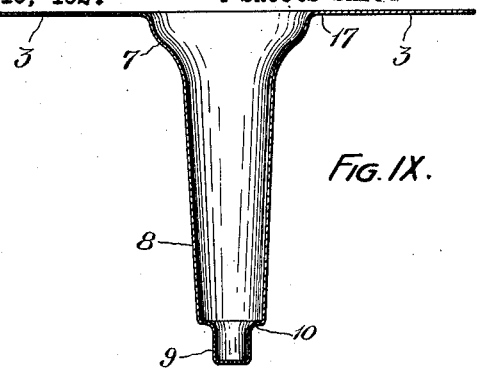
FIG. IX.
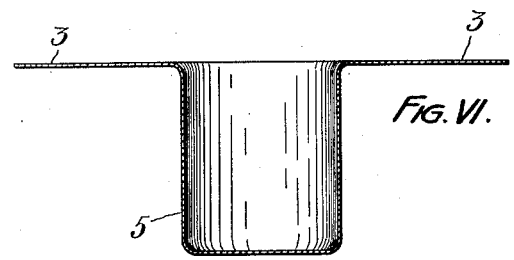
FIG. VI.
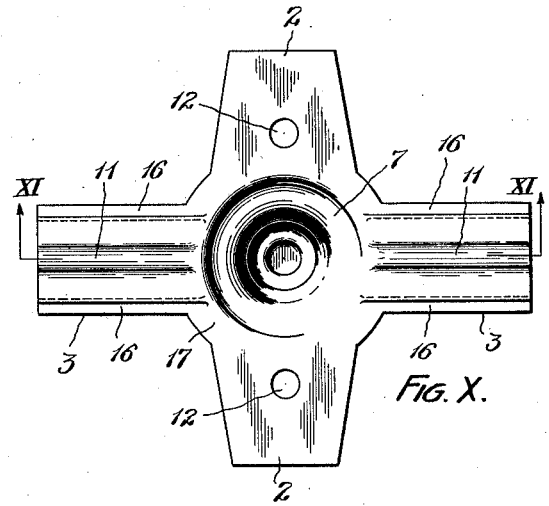
FIG. X.
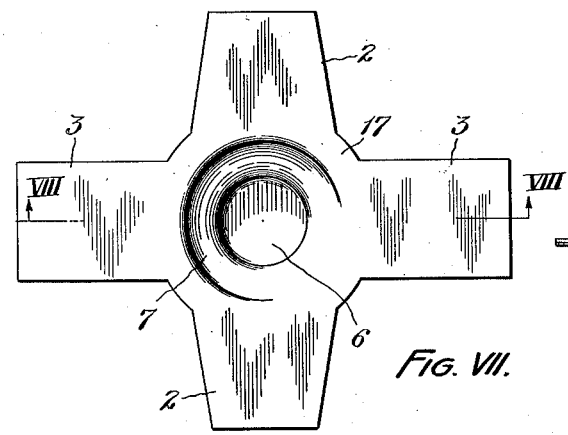
FIG. VII.
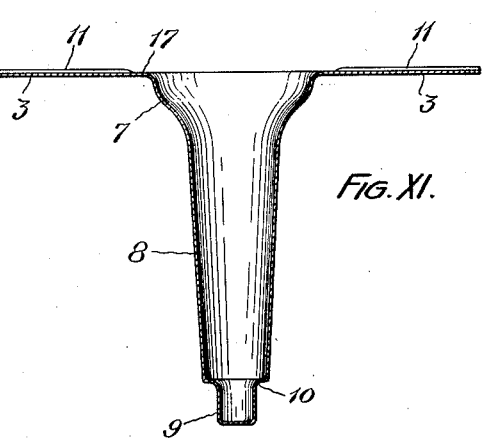
FIG. XI.
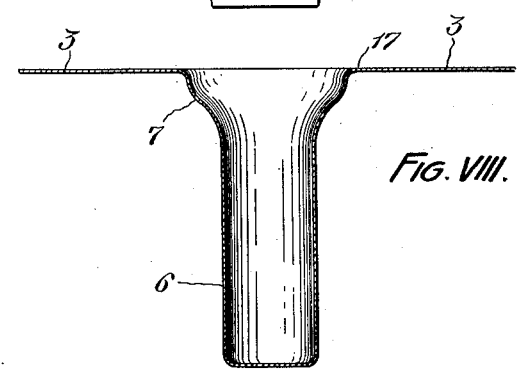
FIG. VIII.
INVENTORS:
HERALD P. ARNT
ERNEST J. ARNOLD
by their atty.

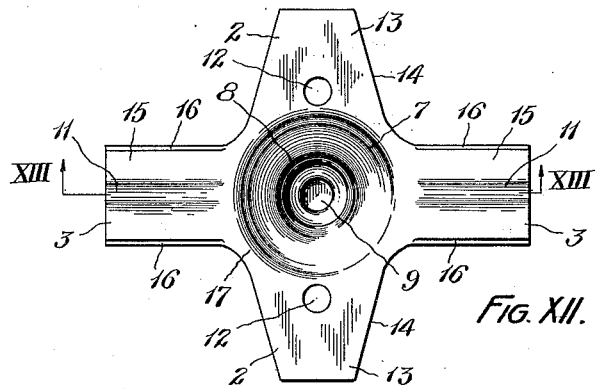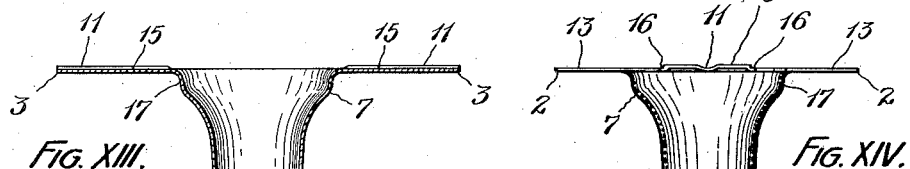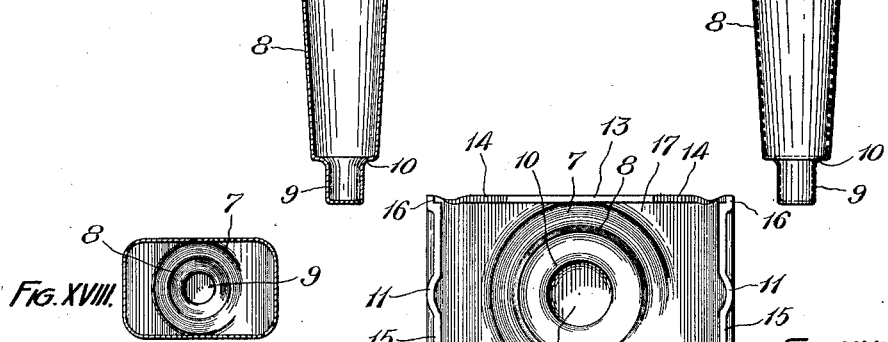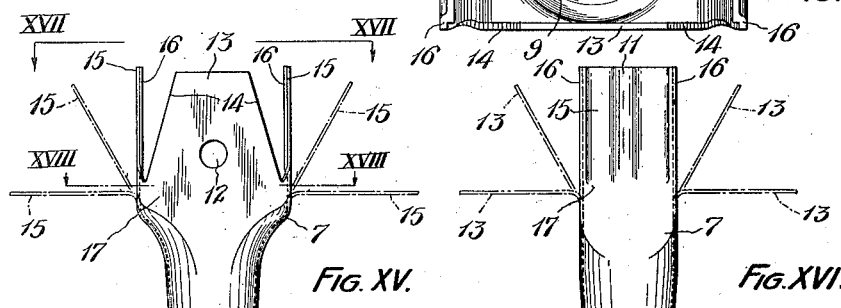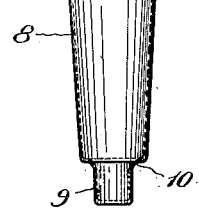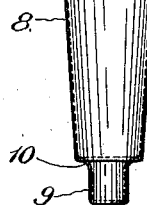

Oct. 16, 1928.
H. P. ARNT ET AL
1,687,487
TUBULAR SPOKE AND METHOD OF MAKING IT
Filed April 15, 1924 4 Sheets-Sheet 4
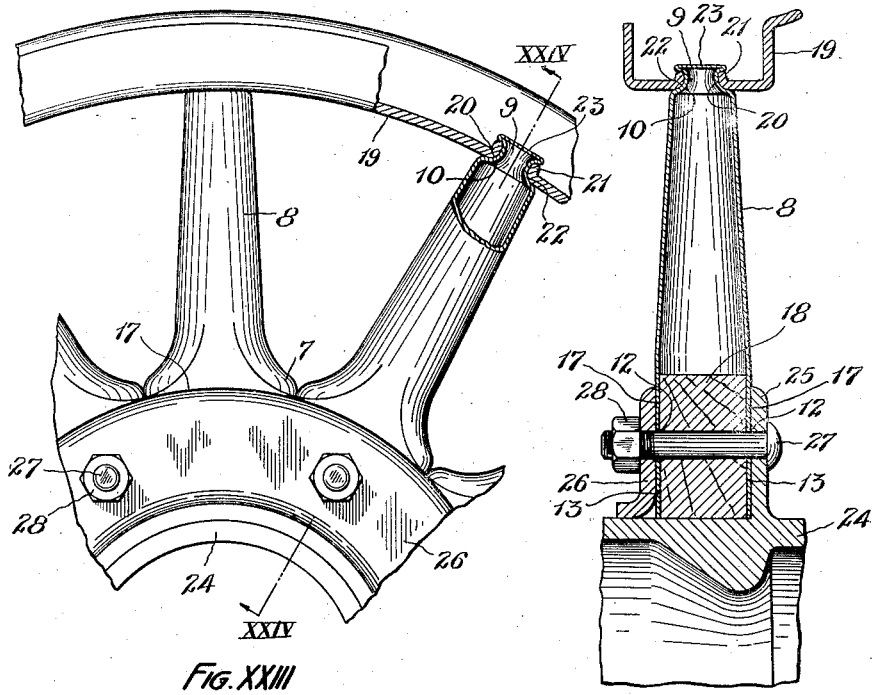
Fig. XXIII
Fig. XXIV
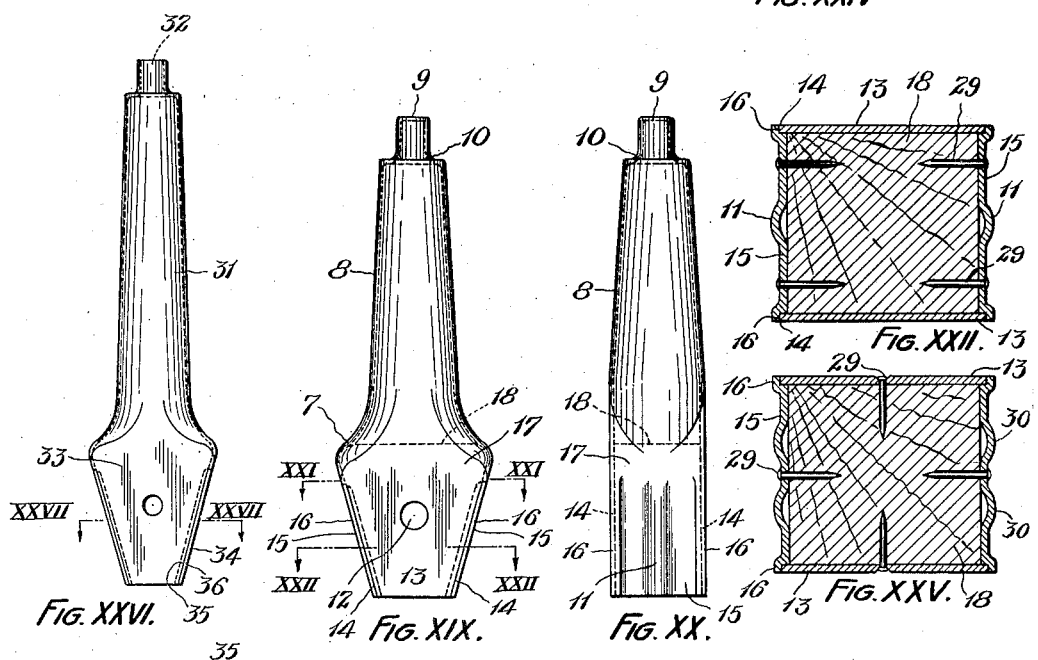
INVENTORS:
HERALD P. ARNT
ERNEST J. ARNOLD
by his atty.

Patented Oct. 16, 1928.

1,687,487

UNITED STATES PATENT OFFICE.

HERALD P. ARNT, OF LAKEWOOD, AND ERNEST JAMES ARNOLD, OF CLEVELAND, OHIO, ASSIGNORS, BY DIRECT AND MESNE ASSIGNMENTS, OF ONE-FOURTH TO CURT B. MULLER, OF CLEVELAND, OHIO.

TUBULAR SPOKE AND METHOD OF MAKING IT.

Application filed April 15, 1924. Serial No. 706,679.

Our invention pertains to a tubular spoke and to the method of making it. More particularly, this disclosure proposes the manufacture of a spoke out of an integral piece of material including drawing, forming and bending operations.

One object of our invention is the manufacture of a spoke which will not require any welding operation. A further object is the sufficiently economical method of so manufacturing a spoke having its nave ends of frustro-wedge shaped form and which will provide adequate strength even without the insertion in the nave ends of reenforcing blocks which might be recommended for certain wheels to be subject to heavy duty.

This application is to be considered a modification, in respect to any common disclosure, of two pending applications of Herald P.
Arnt both filed April 11, 1923, and bearing Serial Nos. 631,326 and 631,327.

We propose to provide a suitable metal blank from which the major portion of the spoke length will be drawn while leaving at one end an angularly projecting body of metal which may be regarded as a flange and which is fashioned with a plurality of converging slits or circumferentially spaced cut out portions to provide a corresponding number of (four) wings having opposite edges converging toward their free extremities. The converging edges of an oppositely disposed pair of the wings at the intended nave end of the spoke are moreover to be flanged so that when the four wings are bent toward each other, to bring adjacent edges into abutting relationship, the four wings may have their edges interlocked against continued inward movement whereby to prescribe the measure of approach movement of each oppositely disposed pair of wings.

Adverting to the drawings:

Figure I is a plan view of a blank, of peculiar shape, which we propose successively to draw, crimp and stamp to tubular spoke conformation.

Figure II is a section on line II—II of Figure I.

Figure III is a plan view of the blank as it will appear after an initial drawing operation.

Figure IV is a section on line IV—IV of Figure III.

Figure V is a plan view of the stamping following a later stage of the drawing operation.

Figure VI is a section on line VI—VI of Figure V.

Figure VII is a plan view of the blank after a still later drawing operation.

Figure VIII is a vertical section on line VIII—VIII of Figure VII.

Figure IX is a vertical section through the stamping after the final drawing operation.

Figure X is a plan view of the stamping subsequent to the performance of crimping and hole punching operations.

Figure XI is a vertical section on line XI—XI of Figure X.

Figure XII is a plan view of the stamping after trimming and flanging different edges thereof.

Figure XIII is a vertical section on line XIII—XIII of Figure XII.

Figure XIV is a side elevation of Figure XII viewed at an angle of ninety degrees with respect to the point of view from which Figure XIII is seen.

Figure XV is a side elevation of the stamping after bending the four wings toward each other as a nave forming operation.

Figure XVI is an edge view of the completed spoke shown in Figure XV.

Figure XVII is an enlarged plan view looking toward the nave end of the spoke, for instance on line XVII—XVII of Figure XV.

Figure XVIII is a plan section on line XVIII—XVIII of Fig. XV before the final operation of bringing the edges of the wings into engagement.

Figure XIX is a side elevation of a completed spoke showing its nave end enclosing a wood block indicated in dotted lines.

Figure XX is an edge view of Figure XIX.

Figure XXI is a plan section on line XXI—XXI of Figure XIX.

Figure XXII is an enlarged plan section on lines XXII—XXII of Figure XIX.

Figure XXIII is a side elevation, partly in section, of a fragmentary portion of a wheel composed of spokes embodying our invention.

Figure XXIV is a section through the wheel on line XXIV—XXIV of Figure XXIII.

Figure XXV is a view corresponding to Figure XXII showing a slight modification.

Figure XXVI is a side elevation of a modified form of spoke constructed after the manner of our invention.

Figure XXVII is a plan section on line XXVII—XXVII of Figure XXVI.

The blank shown in Figure I includes a central portion 1 of circular form, but for the projection therefrom of two pairs of diametrically opposite or quadrantly spaced wings 2 and 3 respectively. The first drawing operation imparts the shallow cup-shaped formation 4, which is next progressively elongated and at the same time narrowed to the form 5 as appears in Figure VI. Thereafter, the drawing operation is continued to still further lengthen and narrow the tubular portion 6 and incidentally fashion the upper portion thereof with a flare or enlargement 7 defined by a surface having inverse curves. The final drawing operation tapers the tubular section as indicated by the numeral 8 in Figure IX so that the diameter is progressively reduced in a direction away from the wings 2 and 3. The final drawing operation furthermore constricts the closed end at 9 to form a fillet at 10. Next, the two wings 3 are crimped to impart a middle corrugation or bead 11 projecting downwardly as viewed in Figure X. At the same time or subsequently, a hole 12 is punched in each of the wings 2. Thereafter, the stamping is trimmed and flanged so that it appears as shown in Figures XII, XIII and XIV, from which it will be observed that a pair of diametrically opposite wings 13 have side edges 14 converging toward their free ends and that another pair of diametrically opposite wings 15 have each had their two parallel edges additionally fashioned with offset flanges 16 coincidently with the crimping of the beads 11. To be especially noticed, is the provision of the continuous body of metal 17 extending entirely around the nave end of the spoke and around the larger end of a reinforcing block to be later described, but appearing in Fig. XXI.

Attention to Figures XV and XVI reveals the manner in which the wings 13 and 15 are to be bent toward each other preparatory to finally assuming the positions shown in Figures XIX, XX, XXI and XXII where the edges 14 are shown abutting marginal portions or the surfaces of the flanges 16 so that an overlap occurs whereby each pair of oppositely disposed wings limits the inward movement of the other pair of wings. According to the preferred exemplification, a properly shaped wooden block 18 is inserted in the nave end of the spoke when the wings have assumed the position shown by the full lines in Figures XV and XVI and so that one portion of two of the side surfaces of the block conform to and abut the interior surface of the flare 7 and section 17 and the remaining side surfaces of the block may be engaged by the inner surfaces of the wings when the latter are brought to the positions in which they appear in Figure XVII and XIX. The wooden block serves the obvious expedient of a reenforcement which might occasionally be desired.

A felloe 19 is provided with circumferentially arranged holes 20 bordered by outwardly projecting flanges 21, the hole defining surface at the junction of the felloe 19 and flange 21 being curved at 22 to conform to the curvature of the fillets 10. The reduced extremity 9 of each of the spokes is then inserted through one of the openings 20 and being of sufficient length is thereafter expanded in any approved manner across and against the flange 21 as shown at 23. A hub 24 carries an annular flange 25 between it and a cooperating ring 26 the nave ends of the spokes are to be clamped by means of a bolt 27 passed through alined holes in the flange 25 and ring 26 through the holes 12 and through registering holes in the blocks 18 as is clearly shown in Figure XXIV preparatory to the coaction of a nut 28. The purpose of the corrugations 11, besides lending strength is to provide a three point or rather three parallel line contact between adjacent spokes in radial planes of the wheel. It is to be particularly observed that the larger edges of the flange 25 and ring 26 overlap the interjacent body of metal 17 so that when the wheel parts are assembled the abutting edges 14 and 16 of the wings will be concealed, also, that the mid-section or flare 7 has one end of the block 18 fitted therein to realize the advantage of reinforcing that section of the nave end which, (as shown in Figures XXIII and XXIV) is not confined by the hub flange 25 and ring 26. However, the provision of the unsplit and flared section 17 around the largest portion of the nave end of the spoke further fulfills the important function of increasing the strength at that point. If desired, small nails 29 may be driven into the block 18 through openings provided in the wings to hold them in position and facilitate the wheel assembling procedure.

The modification shown in Figure XXV consists merely in the provision on two of the opposite wings of a pair of corrugations 30. Figures XXVI and XXVII pertain to a somewhat longer spoke 31 having its reduced outer end open at 32 which may be accomplished by a punching out operation in a manner well known to the art and which will enable spinning the outer end around the felloe flange 21. The reenforcing block has furthermore been omitted from the nave end of the spoke 31, the wings 33 and 34 of which being bent inward so that their edges 35 and 36 abut as shown in Figure XXVII.

We claim:—

1. A tubular spoke composed of an integral piece of metal and having one end terminating as wings, some edge-bordering surfaces of wings being offset and in overlapped abutment with adjacent end surfaces of other of said wings.

2. The method of making a tubular member from a single piece of metal which consists in drawing out the major portion of its length from a blank provided with quadrantly projecting wings side edges of which converge so as to leave a section around one end from which said wings project, and then bending the wings toward each other until pairs of near edges of adjacent wings abut at the corners of a frusto-wedge-shaped end.

3. The method of making a tubular spoke from a single piece of metal which consists in drawing out the major portion of its length from a blank provided with quadrantly projecting wings so as to leave a section around one end together with two pairs of diametrically opposite wings projecting from said section, forming flanges along some of the edges of the said wings, and then bending said wings toward each other until their edges abut.

4. The method of making a tubular spoke from a single piece of metal which consists in drawing the major portion of its length from a blank while leaving the largest, multi-sided and integral axis-enveloping section at the commencing end and while also leaving a plurality of wings projecting laterally from different sides of said largest section and then bending said wings to a longitudinally projecting position to form in conjunction with said section an open frusto-wedge shaped nave spoke end.

5. The method of making a tubular spoke from a single piece of metal having a plurality of circumferentially arranged projecting sections which consists in drawing its length from only a central part of the metal blank and then bending said sections toward each other until the edges of each abuts edges of another pair of sections.

6. The method of making a tubular spoke from a single piece of metal having four circumferentially arranged projecting sections, an opposite pair of which are fashioned with converging edges which consists in drawing its length from the middle of the metal blank forming flanges along the edges of two opposite sections, and then bending said sections toward each other until the edges of one pair abut the flanges on the other pair.

7. The method of making a tubular spoke from a single piece of metal having four circumferentially arranged projecting sections some fashioned with converging edges which consists in drawing its length from only a part of the central portion of the metal blank to leave a bordering flange, forming beads on certain of said sections, and then bending said flange and sections until the edges of one pair of sections abut the edges of the other pair.

8. A tubular spoke composed of a single piece of metal, and having one end provided with four resilient wings, lateral edges of opposite ones of said wings converge toward their extremities, the edges of pairs of said wings being in juxtaposition to achieve a frusto-wedge shaped nave end.

9. The method of making a tubular metal spoke, which consists in converting a blank to tubular formation to produce a comparatively larger nave end of polygonal cross-section with four divericating wings projecting therefrom, forming parallelly extending offset portions on oppositely disposed ones of said wings, bending all four wings toward each other, necessitating between said wings a reinforcing element having two converging sides and then modifying opposite ones of said wings to cause them to abut said converging sides.

10. The method of making a tubular metal spoke, which consists in converting a blank to tubular formation to produce a comparatively larger nave end of polygonal cross section with divericating wings projecting therefrom, modifying said wings by forming offsets along certain edges thereof, inserting a filler into said end, and then causing the edges of opposite ones of said wings to be overlapped by the offset ends of the remaining wings.

11. The method of making a tubular metal spoke, which consists in drawing the same from a sheet metal blank having four wings to form a tubular body portion from the wing connecting area, and then bending the wings into frusto-wedge shaped quadrilateral form with their edges in contact at the corners of said quadrilateral end.

12. The method of making a reinforced tubular metal spoke, which consists in drawing a tubular body by successive steps from a central section of a sheet metal blank which has four wings sequentially projecting at 90° with reference to each other, inserting a frustro-wedge shaped reinforcing element partially into said tubular body, and then causing said wings collectively to compose a frusto-wedge shaped nave end and to confine said correspondingly shaped reinforcing element.

13. The method of making a spoke, which consists in providing a metal blank with projecting wings, drawing a central portion of the blank by pressure into an offset tubular portion and then displacing the wings into a polygonal shaped nave end.

14. The method of making a spoke, which consists in providing a metal blank with projecting wings, drawing a central portion of the blank by pressure in an offset varisized tubular portion which is largest at its junction with said wings, inserting a reinforcing element partially into said largest section of said tubular portion, folding the said wings to embrace said reinforcing element, and then locking said wings in such position.

15. The method of making a tubular spoke, consisting of providing a metal blank including a circular central section and a plurality of flat wings extending from the perimeter thereof, drawing it by successive steps from a sheet metal blank into a tubular body portion and then bending the flat wings until the edges of each abut edges of adjacent wings respectively.

16. The method of making a tubular spoke, consisting of providing a metal blank including a circular central section and four quadrantly spaced wings extending from and some progressively narrower away from the perimeter thereof, drawing it by successive steps from a sheet metal blank into a tubular body portion, inserting a filler and then bending the wings toward each other until respective edges thereof abut and the inside of each wing contacts said filler.

17. A reinforced tubular metal spoke comprising a tubular body portion having at one end a continuous axis-encompassing and varisized enlargement which diminishes in both longitudinal directions from a cross sectional plane therethrough, said spoke further comprising wings adapted to be flexed to project in different directions from the extremity of said enlargement of the tubular body portion, a reinforcing element having one portion fitted into said entire enlargement of said tubular body portion, said wings abutting the remaining portion of said reinforcing element.

18. A reinforced tubular metal spoke comprising a tubular body portion which is enlarged near one end and still nearer said end again reduced in compass at said end, said spoke further comprising four complementary wings adapted to be flexed to project in different directions from said end of the tubular body portion, a quadrilateral block having its larger end fitted in the enlarged end of said tubular body portion so as to contact the varisized interior surface thereof, said wings abutting the four sides of the smaller end of said block and means for securing the wings to the block.

19. A tubular metal spoke provided at its nave end with four wings defining a frusto-wedge shape with one opposite pair of wings substantially parallel and the other pair of opposite wings converging toward their free ends, said converging wings adapted to be flexed apart to permit of insertion of a frusto-wedge-shaped block, an opposite pair of said wings being fashioned with a plurality of longitudinally extending outward projections.

20. A tubular metal spoke provided at its nave end with four wings defining a frusto-wedge-shape with one opposite pair of wings substantially parallel and the other pair of opposite wings converging toward their free ends, said converging wings adapted to be flexed apart to permit of insertion of a frusto-wedge-shaped block, said converging wings being additionally corrugated for the purpose specified.

21. A tubular metal spoke provided at its nave end with four wings defining a frusto-wedge-shape with one opposite pair of wings substantially parallel and the other pair of opposite wings converging toward their free ends, said converging wings adapted to be flexed apart to permit of insertion of a frusto-wedge-shaped block, an opposite pair of said wings being fashioned along longitudinally extending edges with offset flanges abutting the edges of the other opposite pair of wings respectively.

22. A tubular metal spoke provided at its nave end with four sides defining a frusto-wedge-shape with one opposite pair of sides substantially parallel and the other pair of opposite sides converging toward their free ends, an opposite pair of said sides being fashioned along longitudinally extending edges with offset portions abutting marginal portions of the other opposite pair of sides respectively.

23. The method of making a tubular spoke from a single piece of metal which consists in drawing a tubular section from one portion of a metal blank, providing four circumferentially arranged quadrantly projecting sections at one end, and then constricting the sections against each other to form a frusto wedge-shaped nave end with the marginal portions of said sections abutting each other in pairs.

24. The method of making a tubular spoke from a single piece of metal having four circumferentially arranged projecting sections, which consists in forming a longitudinally extending corrugation on two alternately arranged ones of said sections, drawing a tubular section from only a central portion of the metal blank and then bending the sections toward each other to form a frusto-wedge-shaped nave end with the edges of said sections abutting each other in pairs.

25. The method of making a tubular spoke from a single piece of metal which consists in drawing most of its length from a part of the metal blank, forming the remaining part as approximately quadrant sections of a nave end continuation and then bending said sections toward each other until overlapping abutment occurs at the four corners.

26. The method of making a tubular metal spoke, which consists in drawing the same from a sheet metal blank to form a tubular body portion having a lateral flare at one end, modifying portions of said flared end by forming offsets and then reforming said end by constriction into frusto-wedge-shaped quadrilateral form with corner portions in abutting relationship.

27. The method of making a tubular metal spoke from a single piece of metal which consists in drawing the major portion of its length from a blank while leaving a comparatively larger axis-enveloping section at one end and then successively reforming and constricting said larger section until it assumes a frusto-wedge-shaped nave spoke end having longitudinally extending marginal areas of its sides abutting each other.

28. The method of making a tubular metal spoke from a single piece of metal which consists in drawing the major portion of its length from a blank while leaving the largest axis-enveloping section at the commencing end, forming longitudinally extending circumferentially arranged offset portions on said largest end and finally exerting a constrictive pressure about said largest end to achieve a flat sided frusto-wedge shaped formation with marginal longitudinally extending areas in abutment at its corners.

Signed by us, this 12th day of February, 1924.

HERALD P. ARNT.
ERNEST JAMES ARNOLD.